US010809191B1

(12) United States Patent
Mai

(10) Patent No.: US 10,809,191 B1
(45) Date of Patent: Oct. 20, 2020

(54) METHOD FOR EVALUATING AND CONTROLLING TEMPERATURE INFLUENCE ON A HOMOGENEITY TEST FOR INFRARED OPTICAL MATERIALS

(71) Applicant: China North Standardization Center, Beijing (CN)

(72) Inventor: Lyubo Mai, Beijing (CN)

(73) Assignee: China North Standardization Center, Beijing (CN)

( * ) Notice: Subject to any disclaimer, the term of this patent is extended or adjusted under 35 U.S.C. 154(b) by 0 days.

(21) Appl. No.: 16/939,675

(22) Filed: Jul. 27, 2020

Related U.S. Application Data

(63) Continuation of application No. PCT/CN2019/109387, filed on Sep. 30, 2019.

(30) Foreign Application Priority Data

Oct. 19, 2018 (CN) .......................... 2018 1 1219048

(51) Int. Cl.
| | | |
|---|---|---|
| G01N 21/00 | (2006.01) | |
| G01N 21/41 | (2006.01) | |
| G01M 11/02 | (2006.01) | |

(52) U.S. Cl.
CPC ..... *G01N 21/4133* (2013.01); *G01M 11/0207* (2013.01); *G01M 11/0228* (2013.01); *G01N 2021/414* (2013.01)

(58) Field of Classification Search
CPC ........................... G01N 21/00; G01N 21/4788
See application file for complete search history.

(56) References Cited

U.S. PATENT DOCUMENTS

| | | | |
|---|---|---|---|
| 2005/0140967 A1 | 6/2005 | Yamaguchi et al. | |
| 2009/0230293 A1 | 9/2009 | Hogasteni et al. | |
| 2015/0093832 A1* | 4/2015 | Jernakoff ............. | G01N 17/004 |
| | | | 436/23 |

FOREIGN PATENT DOCUMENTS

| | | |
|---|---|---|
| CN | 101251497 A | 8/2008 |
| CN | 102226738 A | 10/2011 |

(Continued)

OTHER PUBLICATIONS

Liang Fei et al.,Uncertainty evaluation in infrared optical material refractive index homogeneity measurement.

*Primary Examiner* — David P Porta
*Assistant Examiner* — Fani Boosalis
(74) *Attorney, Agent, or Firm* — Wayne & Ken, LLC; Tony Hom

(57) ABSTRACT

The present application relates to the measurement technology of the homogeneity in optical materials, and more particularly to a method for evaluating and controlling temperature influence on a homogeneity test for infrared optical materials. The precision of the test results is found to be affected by local small temperature changes of the sample during the homogeneity test for the refractive indexes of infrared optical materials, the invention establishes a two-dimensional numerical table in which the test precision requirements of a refractive index homogeneity test for infrared optical materials correspond to the ambient control temperatures in the test room corresponding to the influence of temperature changes on the refractive index of different infrared optical materials. In addition, related calculation formulas are established for theory analysis, numerical calculation and form-designing. The method of the present invention accurately guides the temperature control for the precision of the homogeneity test for infrared optical materials.

7 Claims, 2 Drawing Sheets

(56) References Cited

FOREIGN PATENT DOCUMENTS

| | | |
|---|---|---|
| CN | 105371964 A | 3/2016 |
| CN | 106248350 A | 12/2016 |
| CN | 107976255 A | 5/2018 |
| CN | 108322732 A | 7/2018 |
| CN | 109406108 A | 3/2019 |

* cited by examiner

METHOD FOR EVALUATING AND CONTROLLING TEMPERATURE INFLUENCE ON A HOMOGENEITY TEST FOR INFRARED OPTICAL MATERIALS

CROSS-REFERENCE TO RELATED APPLICATIONS

This application is a continuation of International Application No. PCT/CN2019/109387 with a filing date of Sep. 30, 2019, designating the United States, now pending, and further claims the benefit of priority from Chinese Patent Application No. 201811219048.6, with a filing date of Oct. 19, 2018. The content of the aforementioned application, including any intervening amendments thereto, is incorporated herein by reference in its entirety.

TECHNICAL FIELD

The present application relates to homogeneity tests for infrared optical materials, and more particularly to a method for evaluating and controlling temperature influence on a homogeneity test for infrared optical materials.

BACKGROUND OF THE INVENTION

The homogeneity test for infrared optical materials is a high-precision test to detect the homogeneity of the refractive index of infrared optical materials, in which the test precision is usually required to be as high as $1\times10^{-4} \sim 1\times10^{-5}$ according to different test precision requirements. Generally, efforts are made on the precision of the test equipment and the test methods to ensure a high precision of the homogeneity test of the refractive index, and however high-precision tests cannot be realized only by the high-precision equipment and the high-precision method. Up to $4\times10^{-4} \sim 1\times10^{-5}$ is caused for the refractive index of different infrared materials due to the temperature change of infrared optical materials per centigrade, and test rooms have a temperature tolerance of 22° C.±2° C. or 22° C.±1° C. Therefore, if the influence of the ambient temperature change in the test room on the refractive index of the sample is not evaluated and controlled, the test results will seriously deviate from the actual situation, causing invalid test results. Therefore, the homogeneity tests for infrared optical materials need a method for evaluating and controlling temperature influence on homogeneity tests for infrared optical materials to guide and control the ambient temperature in the test room, so as to ensure that the ambient temperature in the test room meets the precision requirements of the test.

Currently, the ambient temperature in the test room for the homogeneity tests of the infrared optical materials is simply specified as 22° C.±2° C. or 22° C.±1° C. without taking the temperature change coefficient and the test precision requirements into consideration, which ignored the serious impact caused by the sudden change of the ambient temperature in a short period of time (during test) on the test results. As a result, if materials are required to have a high test precision, and refractive index thereof is sensitive to temperature changes thereof, the test results of such materials are seriously distorted, and the results of the homogeneity test for infrared optical materials lose credibility and availability thereof.

SUMMARY OF THE INVENTION

The technical problem to be solved by the present invention is how to design a method for evaluating and controlling temperature influence on a homogeneity test for infrared optical materials, so that the ambient temperature in the test room is accurately controlled in the homogeneity test for infrared optical materials, so as to ensure the predetermined precision of the homogeneity test.

In order to solve the above technical problem, the present invention provides a method for evaluating and controlling temperature influence on a homogeneity test for infrared optical materials, comprising:

1) setting test precision requirements for a homogeneity test of refractive index as $P_{\Delta n}$, a thickness of a sample as $t_0$, the number of times that an infrared radiation flux transmits through the sample as N, and a wavefront distortion of reference waves corresponding to $P_{\Delta n}$ as $\Delta W_P$; wherein $\Delta W_P$ is calculated according to:

$$\Delta W_P = N t_0 P_{\Delta n}; \quad (1)$$

2) when an ambient temperature in a test room changes, bringing a local temperature increment $\Delta T$ of the sample and a wavefront distortion $\Delta W_{\Delta T}$ of the reference waves; setting a nominal refractive index of the infrared optical materials of samples as $n_0$, a thermo-optical coefficient of the infrared optical materials of the samples as G, a thermal expansion coefficient of the infrared optical materials of the samples as $\alpha$, and a temperature gradient coefficient of refractive indexes of the infrared optical materials of the samples as dn/dt; wherein the wavefront distortion caused by the local temperature increment $\Delta T$ of the sample is $\Delta W_{\Delta T}$; and $\Delta W_{\Delta T}$ is calculated according to:

$$\Delta W_{\Delta T} = N t_0 \Delta T G = N t_0 \Delta T \left[ (n_0 - 1)\alpha + \frac{dn}{dt} \right]; \quad (2)$$

3) enabling the test precision requirements of the homogeneity test for infrared optical materials to satisfy:

$$\Delta W_{\Delta T} \leq k \Delta W_P; \quad (3)$$

wherein k is the precision control factor of the influence of temperature; and transforming formula (3) into formula (4):

$$\Delta T \leq k \frac{P_{\Delta n}}{G}; \quad (4)$$

4) determining a range of the test precision requirements $P_{\Delta n}$ of the sample of infrared optical materials;

5) determining a range of the thermo-optical coefficient G of the infrared optical materials based on the formula (2);

6) according to the formula (4) in step 3, the range of the test precision requirements $P_{\Delta n}$ determined in step 4, and the range of the thermo-optical coefficient G of infrared optical materials determined in step 5, establishing a temperature influence control numerical table corresponding to the test precision requirements of the homogeneity test for the infrared optical materials; and 7) controlling the ambient temperature in the test room during the test using corresponding temperature control data in the temperature influence control numerical table according to the test precision requirements and materials of the sample.

In an embodiment, k is 1/2, 1/3, 1/4, or 1/5; the smaller a value of k, the smaller influence of temperature changes on precision of the homogeneity test; and a minimum precision of the homogeneity test is obtained when k is set as 1/2.

In an embodiment, in step 4, the range of the test precision requirements $P_{\Delta n}$ of the homogeneity test of infrared optical materials is determined to be $1\times10^{-5}$-$1\times10^{-4}$; and the test precision requirements are divided into four levels by multiplying by 2 times or approximately 2 times each time from the highest to the lowest test precision requirements; and the four levels of the test precision requirements $P_{\Delta n}$ are $1\times10^{-5}$, $2\times10^{-5}$, $4\times10^{-5}$, and $10\times10^{-5}$.

In an embodiment, in step 5, based on the formula (2), according to the thermo-optical coefficient G of a germanium crystal material in which the refractive index thereof is the most sensitive to temperature changes thereof, and the thermo-optical coefficient G of a fused silica material in which a refractive index thereof is the least sensitive to temperature changes thereof, and a concentration relationship of the thermo-optical coefficient G of other infrared optical materials, the thermo-optical coefficient G is divided into seven levels: $1\times10^{-5}/°$ C., $2\times10^{-5}/°$ C., $4\times10^{-5}/°$ C., $6\times10^{-5}/°$ C., $10\times10^{-5}/°$ C., $15\times10^{-5}/°$ C. and $40\times10^{-5}/°$ C.

In an embodiment, in step S6, the temperature influence control numerical table is Table 1:

DETAILED DESCRIPTION OF EMBODIMENTS

Figure 1:
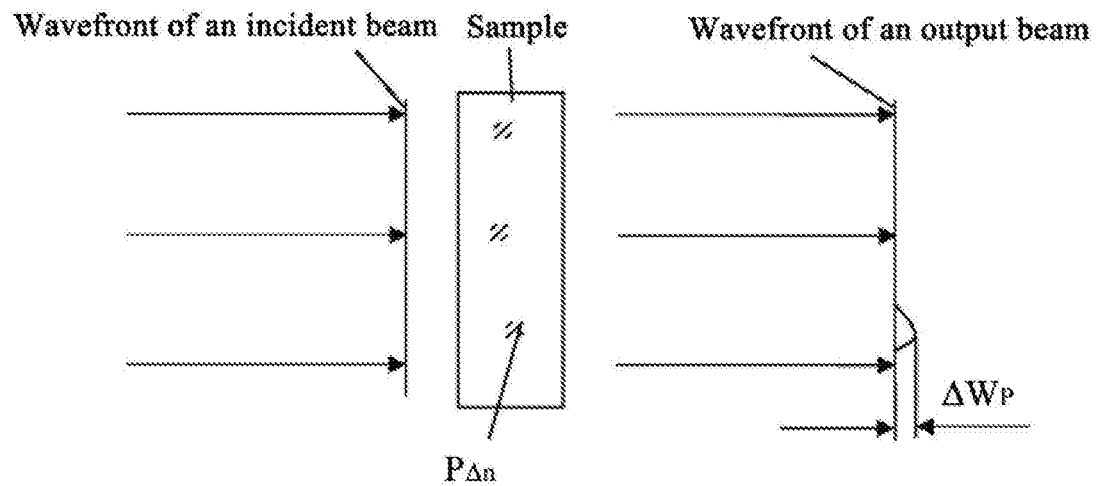
FIG. 1 is a diagram showing a wavefront distortion corresponding to an allowable precision of a homogeneity test for an infrared optical material.

The present invention will be further described in detail with reference to the accompanying drawings and embodiments, from which the purpose, content and advantages of the present invention will be clearer.

The precision of a test result is seriously affected by small local temperature changes of a sample during the homogeneity test of refractive index. The present invention establishes a two-dimensional numerical table in which the test precision requirements of a refractive index test of infrared optical materials and the ambient control temperatures corresponding to the influence of temperature changes on the refractive index of different infrared optical materials, and related calculation formulas are established. In addition, related calculation formulas are established for theory analysis, numerical calculation and table-designing. Therefore, the present invention provides a method for evaluating and controlling temperature influence on a homogeneity test for infrared optical materials to accurately control the temperature, thereby ensuring the precision of the homogeneity test for the infrared optical materials.

TABLE 1

Temperature influence control numerical table corresponding to precision of homogeneity test for the infrared optical materials

| Test precision requirements of homogeneity test | Thermo-optical coefficient Gs of infrared optical materials | | | | | | |
|---|---|---|---|---|---|---|---|
| | $1\times10^{-5}/°$ C. | $2\times10^{-5}/°$ C. | $4\times10^{-5}/°$ C. | $6\times10^{-5}/°$ C. | $10\times10^{-5}/°$ C. | $15\times10^{-5}/°$ C. | $40\times10^{-5}/°$ C. |
| $10\times10^{-5}$ | 10 k | 5 k | 2.5 k | 1.67 k | 1 k | 0.67 k | 0.25 k |
| $4\times10^{-5}$ | 4 k | 2 k | 1 k | 0.67 k | 0.4 k | 0.27 k | 0.1 k |
| $2\times10^{-5}$ | 2 k | 1 k | 0.5 k | 0.34 k | 0.2 k | 0.14 k | 0.05 k |
| $1\times10^{-5}$ | 1 k | 0.5 k | 0.25 k | 0.17 k | 0.1 k | 0.07 k | 0.03 k |

In an embodiment, when the temperature influence control data in Table 1 is used for control, the values taken for the temperature control are equal to or less than the values in Table 1; the precision control factor k for the influence of temperature in Table 1 is determined according to the precision requirement of the homogeneity test, taking one of 1/2, 1/3, 1/4, and 1/5.

In an embodiment, in step 7, before an interferometry is carried out for the homogeneity test for infrared optical materials, the sample is placed on a test bench for a certain period of heat preservation until the temperature of the sample is completely uniform, so as to avoid that uneven temperature changes affect the homogeneity test for infrared optical materials.

The present invention has the following beneficial effects.

The precision of the test result is found to be affected by a small local temperature change of the sample during the homogeneity test for the refractive index of infrared optical materials, and therefore the invention establishes a two-dimensional numerical table in which the test precision requirements of the refractive index test of the infrared optical materials correspond to the ambient control temperature corresponding to the influence of temperature changes on the refractive index of different infrared optical materials. In addition, related calculation formulas are established for theory analysis, numerical calculation and table-designing. The present invention provides a method for evaluating and controlling temperature influence on a homogeneity test for the infrared optical materials, which can accurately guide the temperature control to ensure the precision of the homogeneity test for the infrared optical materials.

Based on the above-mentioned ideas, the present invention provides a method for evaluating and controlling temperature influence on a homogeneity test for infrared optical materials, comprising the following steps.

1) The high-precision homogeneity test for the refractive index of the infrared optical materials is generally carried out by interferometry, in which the reference waves (usually planar waves) pass through the sample to obtain the wavefront distortion of the inhomogeneity of the refractive index of the sample. Test precision requirements of a homogeneity test for the refractive index are set as $P_{\Delta n}$; a thickness of the sample is set as $t_0$; the number of times that the infrared radiation flux passes through the sample is set as N; and a wavefront distortion of the reference waves corresponding to $P_{\Delta n}$ is set as $\Delta W_P$ (an allowable wavefront distortion of homogeneity of the refractive index), as shown in FIG. 1; and $\Delta W_P$ is calculated according to formula (1):

$$\Delta W_P = Nt_0 P_{\Delta n}. \quad (1)$$

Figure 2:
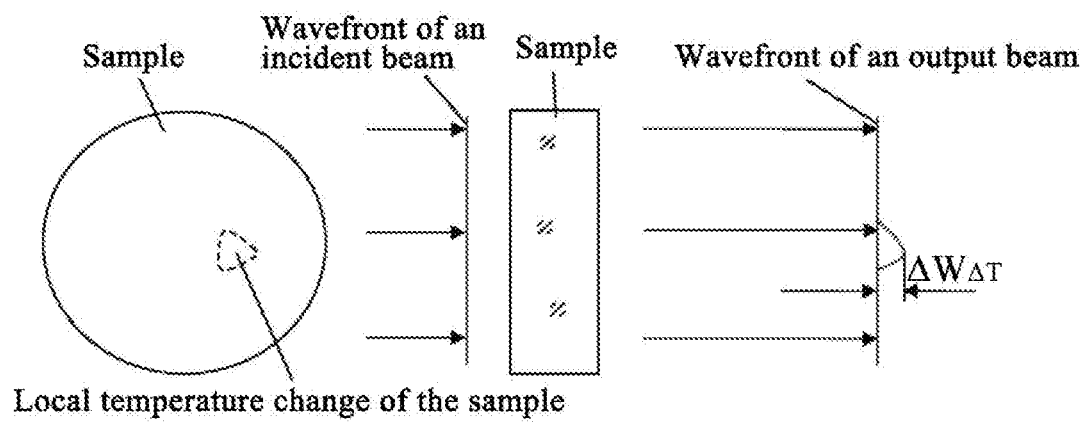
FIG. 2 is a diagram showing the wavefront distortion caused by a local temperature change of an infrared optical material.

3) When the ambient temperature in the test room changes, the local temperature increment ΔT of the sample is caused (because the sudden change of the ambient temperature is non-uniform), and the wavefront distortion of the reference waves is $\Delta W_{\Delta T}$. A nominal refractive index of the infrared optical materials of samples is set to be $n_0$; a thermo-optical coefficient of the infrared optical materials of the samples is set to be G; a thermal expansion coefficient of the infrared optical materials of the samples is set to be α, and a temperature gradient coefficient of refractive indexes of the infrared optical materials of the samples is set to be dn/dt. The wavefront distortion of the reference waves caused by the local temperature increment ΔT of the sample is $\Delta W_{\Delta T}$, as shown in FIG. 2; and $\Delta W_{\Delta T}$ is calculated according to formula (2)

$$\Delta W_{\Delta T} = Nt_0 \Delta T G = Nt_0 \Delta T \left[ (n_0 - 1)\alpha + \frac{dn}{dt} \right]. \quad (2)$$

3) In order to guarantee the test precision requirements $P_{\Delta n}$ of the homogeneity test for the infrared optical materials, the wavefront distortion $\Delta W_{\Delta T}$ caused by the local temperature increment ΔT of the samples of the infrared optical materials should be less than or equal to a product of the wavefront distortion $\Delta W_P$ of the reference waves corresponding to the test precision requirements $P_{\Delta n}$ of the homogeneity of refractive index and the precision control factor k of the influence of temperature; where k may be 1/2, 1/3, 1/4 or 1/5. The smaller a value of k, the smaller an influence of temperature changes on precision of the homogeneity test, and a minimum precision of the homogeneity test is obtained when k is set as 1/2. The test precision requirements should satisfy formula (3):

$$\Delta W_{\Delta T} \leq k \Delta W_P \quad (3); \text{ and}$$

formula (3) is transformed into formula (4):

$$\Delta T \leq k \frac{P_{\Delta n}}{G}. \quad (4)$$

Figure 3:
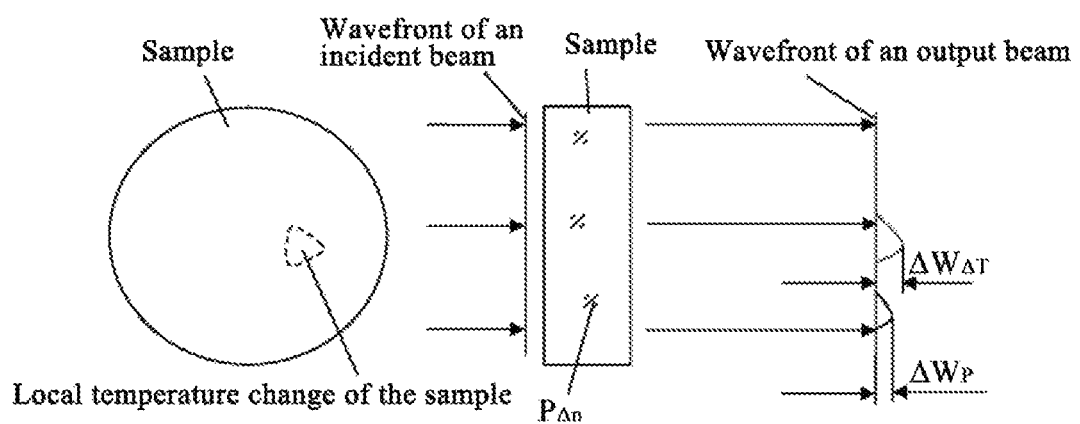
FIG. 3 is a comparison diagram of the wavefront distortion corresponding to the allowable precision and the wavefront distortion caused by the local temperature change in the homogeneity test for an infrared optical material.

If the magnitude of the wavefront distortion $\Delta W_{\Delta T}$ caused by the local temperature increment ΔT of a certain portion of the sample of infrared optical materials is not controlled, it will be higher than or significantly higher than the wavefront distortion $\Delta W_P$ corresponding to the allowable precision $P_{\Delta n}$ for the homogeneity test of refractive index, so that the test precision exceeds or significantly exceeds the allowable precision. The comparison between the wavefront distortion $\Delta W_{\Delta T}$ and the wavefront distortion $\Delta W_P$ is shown in FIG. 3.

4) The range of the test precision requirement $P_{\Delta n}$ of the samples of infrared optical materials is determined. The lowest test precision requirement of the infrared optical materials is $1 \times 10^{-4}$, and the highest test precision requirement thereof is $1 \times 10^{-5}$. Therefore, the range of the test precision requirement $P_{\Delta n}$ is from $1 \times 10^{-5}$ to $1 \times 10^{-4}$. The range of the test precision requirement $P_{\Delta n}$ is divided into four levels by multiplying by 2 times or approximately 2 times each time from the highest to the lowest test precision requirement to meet the more requirements of test precision. The four levels of the test precision requirement $P_{\Delta n}$ are $1 \times 10^{-5}$, $2 \times 10^{-5}$, $4 \times 10^{-5}$, and $10 \times 10^{-5}$.

5) The range of the thermo-optical coefficient G of infrared optical materials is determined. Since the thermo-optical coefficient G of infrared optical materials is equal to $(n_0-1)\alpha + dn/dt$, the refractive index $n_0$ of the infrared optical materials ranges from 1.4 to 4.0, and dn/dt of the infrared optical materials is generally an order of magnitude higher than α, so the thermo-optical coefficient G of infrared optical materials is mainly determined by dn/dt. The refractive index of the germanium crystal material is the most sensitive to temperature changes, and the germanium crystal material has a thermo-optical coefficient G of $4 \times 10^{-4}/°$ C.; the refractive index of a fused silica material is the least sensitive to temperature changes, and the fused silica material has a thermo-optical coefficient G of $1 \times 10^{-5}/°$ C. Most of infrared optical materials have intermediate sensitivities for temperature changes, and thermal-optical coefficient G of these infrared optical materials ranges from $2 \times 10^{-5}/°$ C. to $15 \times 10^{-5}/°$ C. According to a concentration relationship of thermo-optical coefficient G of other infrared optical materials, the thermo-optical coefficient G is divided into seven levels: $1 \times 10^{-5}/°$ C., $2 \times 10^{-5}/°$ C., $4 \times 10^{-5}/°$ C., $6 \times 10^{-5}/°$ C., $10 \times 10^{-5}/°$ C., $15 \times 10^{-5}/°$ C. and $40 \times 10^{-5}/°$ C.

6) According to formula (4) in step 3, the range of the test precision requirements $P_{\Delta n}$ determined in step 4, the range of the thermo-optical coefficient G of the infrared optical materials determined in step 5, the temperature influence control numerical table corresponding to the test precision requirements of the homogeneity test for the infrared optical materials is established (see Table 1), so as to control the temperature in the homogeneity test for various infrared optical materials according to different test precision requirements. When using the temperature control data in Table 1 for control, the values taken for the temperature control are equal to or less than the values in Table 1. The precision control factor k of the influence of the temperature in Table 1 is determined according to the precision requirement of the test:

TABLE 1

Temperature influence control numerical table corresponding to precision of homogeneity test for the infrared optical materials

| Precision requirements of homogeneity test | Thermo-optical coefficient Gs of infrared optical materials | | | | | | |
|---|---|---|---|---|---|---|---|
| | $1 \times 10^{-5}/°$ C. | $2 \times 10^{-5}/°$ C. | $4 \times 10^{-5}/°$ C. | $6 \times 10^{-5}/°$ C. | $10 \times 10^{-5}/°$ C. | $15 \times 10^{-5}/°$ C. | $40 \times 10^{-5}/°$ C. |
| $10 \times 10^{-5}$ | 10 k | 5 k | 2.5 k | 1.67 k | 1 k | 0.67 k | 0.25 k |
| $4 \times 10^{-5}$ | 4 k | 2 k | 1 k | 0.67 k | 0.4 k | 0.27 k | 0.1 k |
| $2 \times 10^{-5}$ | 2 k | 1 k | 0.5 k | 0.34 k | 0.2 k | 0.14 k | 0.05 k |
| $1 \times 10^{-5}$ | 1 k | 0.5 k | 0.25 k | 0.17 k | 0.1 k | 0.07 k | 0.03 k |

7) Two measures are taken to avoid that uneven temperature changes affect the homogeneity test for infrared optical materials. First, before an interferometry is carried out for the homogeneity test of infrared optical materials, the sample is placed on the test bench for a certain period of heat preservation until the temperature of the sample is completely uniform. Second, the ambient temperature in the test room is controlled using corresponding temperature control data in the temperature influence control numerical table in Table 1 according to the test precision requirements and materials of the sample.

It is found that small temperature changes during test have a serious effect on the test results. A relationship of the ambient control temperatures in the test room is established, in which the range of the test precision requirements of the homogeneity test of infrared optical materials corresponds to the range of the temperature influence coefficient to the refractive index, and related algorithm formulas for numerical calculation are established. A numerical table in which ambient control temperatures in the test room correspond to the test precision requirements of homogeneity tests for the infrared optical materials is established.

The invention provides a method for evaluating and controlling temperature influence on the homogeneity test for infrared optical materials, which can provide specific values of the ambient control temperatures in the test room corresponding to the precision of the homogeneity test for the infrared optical materials. In addition, the method of the present invention can be used not only to evaluate the temperature influence on the homogeneity test for infrared optical materials but also to evaluate that of the optical materials of visible light and ultraviolet light and so on.

The invention can provide a specific guidance for the test precision requirements of the homogeneity test for infrared optical materials and for the temperature influence control of homogeneity test of refractive index of various materials such as infrared optical crystals, infrared glass, infrared ceramics, so as to obtain actual results of the homogeneity test for infrared optical materials. The range of the test precision requirements calculated above can be expanded and subdivided as required. The method of the invention can also be used to evaluate and control the ambient temperature of the tests to obtain test result parameters by testing relevant wavefronts of the samples.

The above are only preferred embodiments of the present invention. It should be noted that improvements and modifications made by those ordinary skill in the art without departing from the principle of the present invention shall fall within the protecting scope of the present invention.

What is claimed is:

1. A method for evaluating and controlling temperature influence on a homogeneity test for infrared optical materials, comprising:
   1) setting test precision requirements for the homogeneity test of refractive index as $P_{\Delta n}$, a thickness of a sample as $t_0$, the number of times that an infrared radiation flux passes through the sample as N, a wavefront distortion of reference waves corresponding to $P_{\Delta n}$ as $\Delta W_P$; wherein $\Delta W_P$ is calculated according to:

$$\Delta W_P = Nt_0 P_{\Delta n}; \tag{1}$$

2) when an ambient temperature in a test room changes, bringing a local temperature increment $\Delta T$ of the sample and a wavefront distortion $\Delta W_{\Delta T}$ of the reference waves; setting a nominal refractive index of infrared optical materials of samples as $n_0$, a thermo-optical coefficient of infrared optical materials as G, a thermal expansion coefficient of infrared optical materials of the samples as $\alpha$, and a temperature gradient coefficient of refractive indexes of infrared optical materials of the samples as dn/dt; wherein the wavefront distortion of the reference waves brought by the local temperature increment $\Delta T$ of the sample is $\Delta W_{\Delta T}$, and $\Delta W_{\Delta T}$ is calculated according to:

$$\Delta W_{\Delta T} = Nt_0 \Delta T G = Nt_0 \Delta T \left[ (n_0 - 1)\alpha + \frac{dn}{dt} \right]; \tag{2}$$

3) enabling the test precision requirements of the homogeneity test for infrared optical materials to satisfy:

$$\Delta W_{\Delta T} \leq k \Delta W_P; \tag{3}$$

wherein k is the precision control factor of the influence of temperature; and
   transforming formula (3) into formula (4):

$$\Delta T \leq k \frac{P_{\Delta n}}{G}; \tag{4}$$

4) determining a range of the test precision requirements $P_{\Delta n}$ of the samples of the infrared optical materials;
   5) determining a range of the thermo-optical coefficient G of the infrared optical materials based on the formula (2);
   6) according to the formula (4) in step 3, the range of the test precision requirements $P_{\Delta n}$ determined in step 4, and the range of the thermo-optical coefficient G of the infrared optical materials determined in step 5, establishing a temperature influence control numerical table corresponding to the test precision requirements of the homogeneity test for the infrared optical materials; and
   7) controlling the ambient temperature in the test room during test using corresponding temperature control data in the temperature influence control numerical table according to the test precision requirements and materials of the samples.

2. The method of claim 1, wherein k is 1/2, 1/3, 1/4, or 1/5; the smaller a value of k, the smaller an influence of temperature changes on precision of the homogeneity test; and a minimum precision of the homogeneity test is obtained when k is set as 1/2.

3. The method of claim 1, wherein in step 4, the range of the test precision requirements $P_{\Delta n}$ of the homogeneity test for the infrared optical materials is determined to be $1 \times 10^{-5} \sim 1 \times 10^{-4}$; the test precision requirements $P_{\Delta n}$ are divided into four levels by multiplying by 2 times or approximately 2 times each time from the highest to the lowest test precision requirements, and the four levels of the test precision requirements $P_{\Delta n}$ are: $1 \times 10^{-5}$, $2 \times 10^{-5}$, $4 \times 10^{-5}$, and $10 \times 10^{-5}$.

4. The method of claim 3, wherein in step 5, based on the formula (2), according to the thermo-optical coefficient G of a germanium crystal material in which a refractive index is the most sensitive to temperature changes, and the thermo-optical coefficient G of a fused silica material in which a refractive index is the least sensitive to temperature changes, and a concentration relationship of the thermo-optical coefficient G of other infrared optical materials, the thermo-optical coefficient G is divided into seven levels: $1 \times 10^{-5}/°$ C., $2 \times 10^{-5}/°$ C., $4 \times 10^{-5}/°$ C., $6 \times 10^{-5}/°$ C., $10 \times 10^{-5}/°$ C., $15 \times 10^{-5}/°$ C. and $40 \times 10^{-5}/°$C.

5. The method of claim 4, wherein in step 6, the temperature influence control numerical table is Table 1:

TABLE 1

Temperature influence control numerical table corresponding to precision of homogeneity test for the infrared optical materials

| Precision requirements of homogeneity test | Thermo-optical coefficient Gs of infrared optical materials | | | | | | |
|---|---|---|---|---|---|---|---|
| | $1 \times 10^{-5}/°C.$ | $2 \times 10^{-5}/°C.$ | $4 \times 10^{-5}/°C.$ | $6 \times 10^{-5}/°C.$ | $10 \times 10^{-5}/°C.$ | $15 \times 10^{-5}/°C.$ | $40 \times 10^{-5}/°C.$ |
| $10 \times 10^{-5}$ | 10 k | 5 k | 2.5 k | 1.67 k | 1 k | 0.67 k | 0.25 k |
| $4 \times 10^{-5}$ | 4 k | 2 k | 1 k | 0.67 k | 0.4 k | 0.27 k | 0.1 k |
| $2 \times 10^{-5}$ | 2 k | 1 k | 0.5 k | 0.34 k | 0.2 k | 0.14 k | 0.05 k |
| $1 \times 10^{-5}$ | 1 k | 0.5 k | 0.25 k | 0.17 k | 0.1 k | 0.07 k | 0.03 k. |

6. The method of claim 5, wherein when using temperature control data in Table 1 for control, the values taken for the temperature control are equal to or less than the values in Table 1; and the precision control factor k of the influence of temperature in Table 1 is determined according to the test precision requirements of the homogeneity test.

7. The method of claim 1, wherein in step 7, before an interferometry is carried out for the homogeneity test for infrared optical materials, the sample is placed on a test bench for a certain period of heat preservation until the temperature of the sample is completely uniform, so as to avoid that uneven temperature changes affect the homogeneity test for infrared optical materials.

* * * * *